United States Patent
Kates et al.

(10) Patent No.: US 7,602,901 B1
(45) Date of Patent: Oct. 13, 2009

(54) SYSTEM AND METHOD FOR PROVIDING CALLING-PARTY IDENTIFICATION AND/OR CALLING-PARTY OR CALLED-PARTY RINGBACK SERVICES

(75) Inventors: Jesse Kates, Kansas City, MO (US); Robert Miller, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 984 days.

(21) Appl. No.: 10/895,802

(22) Filed: Jul. 21, 2004

(51) Int. Cl.
*H04M 1/00* (2006.01)
*H04M 3/00* (2006.01)

(52) U.S. Cl. .................. 379/373.01; 379/373.02; 379/374.01

(58) Field of Classification Search ............ 379/210.01, 379/373.01, 373.02, 374.01
See application file for complete search history.

(56) References Cited

U.S. PATENT DOCUMENTS

| | | | |
|---|---|---|---|
| 5,490,205 A | 2/1996 | Kondo et al. | |
| 5,926,537 A | 7/1999 | Birze | |
| 6,058,171 A | 5/2000 | Hoopes | |
| 6,259,780 B1 | 7/2001 | Sherwood et al. | |
| 6,463,138 B1 | 10/2002 | Sherwood et al. | |
| 6,546,006 B1 | 4/2003 | Fraser | |
| 6,618,704 B2 | 9/2003 | Kanevsky et al. | |
| 6,911,592 B1 * | 6/2005 | Futamase et al. | 84/622 |
| 7,006,608 B2 | 2/2006 | Seelig et al. | |
| 2001/0012348 A1 | 8/2001 | Latter et al. | |
| 2002/0163999 A1 | 11/2002 | Farris et al. | |
| 2002/0181681 A1 | 12/2002 | Mani | |
| 2003/0002657 A1 | 1/2003 | Seelig et al. | |
| 2003/0054864 A1 * | 3/2003 | Mergler | 455/566 |
| 2003/0059023 A1 * | 3/2003 | Crockett et al. | 379/220.01 |
| 2003/0086558 A1 | 5/2003 | Seelig et al. | |
| 2004/0120494 A1 * | 6/2004 | Jiang et al. | 379/210.01 |
| 2004/0174983 A1 * | 9/2004 | Olschwang et al. | 379/377 |

FOREIGN PATENT DOCUMENTS

WO    WO 01/41411 A2    6/2001

* cited by examiner

*Primary Examiner*—Ahmad F Matar
*Assistant Examiner*—Khai N Nguyen

(57) ABSTRACT

A method and system for providing an audible calling party identification and/or an audible calling/called party ringback services ("services") is disclosed. The system may include (and the method may perform the services in) a network having source, network, and destination nodes. The source and destination nodes may be equipped with ringtone-generation engines to generate ringtones. Each of the ringtones includes at least one audible tone.

The method may include the source and/or destination node receiving from the network node information for producing a ringtone ("ringtone information"). The ringtone information is originated toward the destination node in response to the source node initiating a call to the destination node. After receipt, the source and/or destination nodes may generate the ringtone using their ringtone-generation engines and the ringtone information. After generating the ringtones, the source and/or destination ringtone-generation engines may provide them to users of the respective source and/or destination nodes.

20 Claims, 5 Drawing Sheets

SYSTEM AND METHOD FOR PROVIDING CALLING-PARTY IDENTIFICATION AND/OR CALLING-PARTY OR CALLED-PARTY RINGBACK SERVICES

BACKGROUND

1. Field of the Invention

The following relates in general to telecommunication networks, and more particularly, to generating ringtones based on calling-party identity and calling-party and/or called-party preferences.

2. Description of Related Art

Since inception, telephones have been equipped with a bell or other audible device, e.g., a "ringer" to alert their users of an incoming call. Today, telephones are equipped with audible devices that play ringtones to alert their users of an incoming call and/or message. These audible devices, which are especially predominant among mobile (e.g., cellular) telephone technologies, commonly support a variety of resident, preprogrammed ringtones that a user of a receiving telephone can select, amend, and/or alter. Modern telecommunication and/or computer networks allow users to download an ever-increasing library of ringtones, thereby providing a wide degree of flexibility, control and personalization, thus changing an otherwise neutral device into something personal, and, in many cases, endearing.

More recently, and again, more predominantly in mobile telephone technologies, a user of a receiving telephone is now able to manually associate the resident, programmed ringtones to a particular calling party's phone number. This way, when a call that has an associated ringtone is terminated to the receiving telephone, the receiving telephone may play the associated ringtone.

To facilitate this, the receiving telephone receives information, such as the calling-party's phone number and name, from a telecommunications network that is relaying the call. This information may be relayed to the receiving telephone using, for example, the well-known caller-line identification ("Caller ID") service, which allows the information to be displayed as textual information (i.e., Caller ID text) to the user of the receiving telephone. In addition to displaying the information, the receiving telephone may match the Caller-ID information to an associated ringtone, and then play the associated ringtone to allow the user of the receiving telephone to identify (and/or determine whether to answer the call from) the calling party without needing to look at the Caller ID text.

This arrangement has several shortcomings. First, the calling party cannot influence the ringtone. That is, the ringtone is determined by the receiving party. This happens because the receiving party (i) chooses a telephone model from a wide variety of telephone models, which generally limits the available ringtones (preprogrammed or otherwise); (ii) selects a ringtone from the available ringtones based on, for the most part, personal choices, and then (iii) associates the selected ringtone to a given calling party phone number.

Second, the receiving party must manually associate a ringtone for each potential calling party to identify each calling party. Thus, the receiving telephone will use a default or generic ringtone for calling party numbers that do not have an associated ringtone. Third, if the user wishes to uniquely identify each calling party, then the user has to associate a different ringtone to each calling party number. Fourth, although a wide variety of ringtones exist, each telephone model and generally limits the available ringtones (preprogrammed or otherwise).

Fourth, the association of ringtones with calling parties typically does not extend beyond an individual telephone device. Consequently, each receiving telephone may have different ringtone-to-calling party number association for the same calling party number. The net result is that each user of a receiving device will have a different experience for calls from the same calling party. Moreover, the user of the receiving telephone has to undesirably put up with a certain amount of tedium to maintain the ability to identify different calling parties.

SUMMARY

A method and system for carrying out an audible calling party identification ("audible Caller ID") and/or an audible calling or called party ringback ("audible ringback") services is provided. The audible-Caller-ID and audible ringback services may be carried out in a network having a source node, a network node and a destination node. The source and destination nodes may be equipped with ringtone-generation engines to generate ringtones. Each of the ringtones may include at least one audible tone.

To provide the audible-Caller-ID service, the destination node may receive from the network node information for producing a ringtone ("ringtone information"). This ringtone information is originated toward the destination node in response to the source node initiating a call to the destination node. After receipt of the ringtone information, the destination node may generate the ringtone using its ringtone-generation engine and the ringtone information. After generating the ringtone, the destination node provides the ringtone to a user of the destination node as the audible-Caller-ID service.

To provide the audible ringback services, the source node may receive from the network node information for producing a ringback ringtone ("ringback ringtone information"). This ringback ringtone information is originated back toward the source node in response to the source node initiating a call to the destination node. After receiving the ringback ringtone information, the source node generates the ringback ringtone using its ringtone-generation engine and the ringback ringtone information. And after generating the ringback ringtone, the source node provides the ringback ringtone to a user of the source node as the audible ringback service.

BRIEF DESCRIPTION OF THE DRAWINGS

Presently preferred embodiments of the invention are described below in conjunction with the appended Figures, wherein like reference numerals refer to like elements in the various Figures, and wherein.

DETAILED DESCRIPTION OF EXEMPLARY EMBODIMENTS

1. Exemplary Architecture

Figure 1:
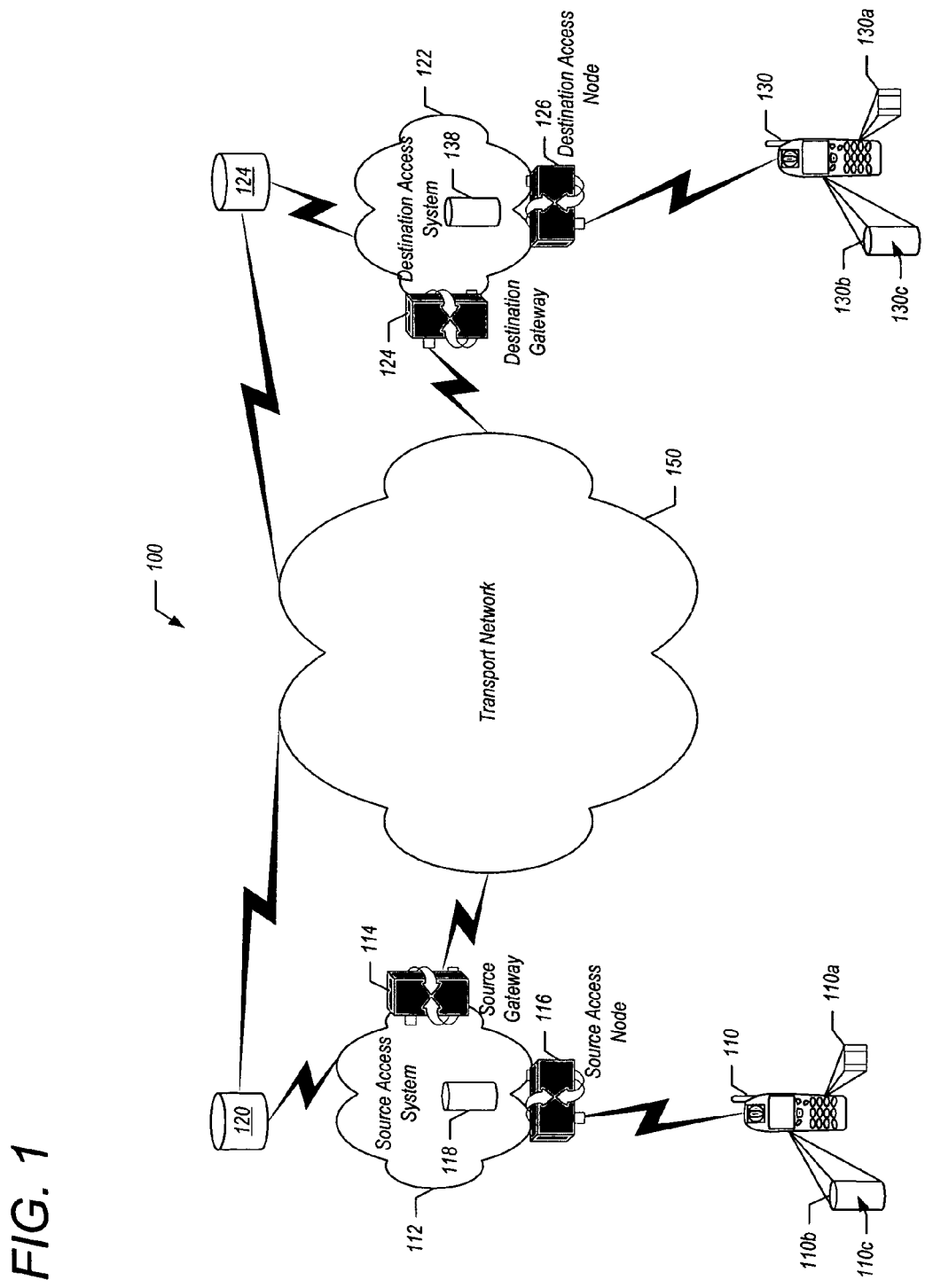
FIG. 1 is a first block diagram depicting an exemplary communication system for carrying out audible-calling-party identification and/or audible-calling/called-party-ringback services in accordance with an exemplary embodiment.

FIG. 1 is a block diagram depicting an exemplary communication system 100 for carrying out an audible calling party identification service ("audible-Caller-ID service") and/or an audible calling/called party ringback service ("audible-ringback service") in accordance with an exemplary embodiment. In the communication system 100, communications may occur between a source node and at least one destination node, namely, a calling-party terminal 110 and a called-party terminal 130, via one or more interconnected networks and network elements.

These interconnected networks and network elements may include, for example, a source access node 116, which provides access to the communication system 100 for the calling-party terminal 110, and a destination access node 126, which provides access to the communication system 100 for the called-party terminal 130. The interconnected networks and network elements may also include a transport network 150 through which the source access node 116 may be communicatively coupled with the destination access node 126, and vice versa.

The communication system 100 may be a partial or full deployment of most any communication or computer network, and thus, can include a few or many network elements, most of which are not shown. The communication system 100 can include circuit-switched as well as packet-data elements to provide transport of voice and data communications between calling-party and called-party terminals 110, 130. It can be public or private, terrestrial wireless or satellite, and/or wireline. Thus, the communication system 100 may include portions of a Public Switch Telephone Network ("PSTN"), the Internet, core and proprietary networks, wireless voice and packet-data networks (e.g., 1G, 2G, 2.5G and 3G telecommunication networks), wide-area networks, wired and wireless local area networks (e.g., Bluetooth and/or IEEE 802.11), and the like.

The transport network 150, like the communication system 100 as a whole, may include various interconnected network elements to provide a path between the source access node 116 and the destination access node 126, and in turn, between the calling party terminal 110 and the called party terminal 130. To facilitate this, the transport network 150, the source access node 116 and the destination access node 126 may include elements of public and/or private communication networks as noted above. And in practice, transport network 150 may include elements of Public Switched Telephone Networks, such as the hardware and services provided by local exchange carriers ("LECs") and interexchange carriers ("IXCs"); private wireline networks, such as enterprise Private Branch Exchange ("PBX"); and/or public and private wireless networks, such as Sprint PCS and/or license-free, Industrial, Scientific and Medical ("ISM") band wireless networks.

While the transport network 150 is shown as one entity, its functions may be distributed among its various interconnected network elements. For instance, the transport network 150 may include or interface to a source access system 112 (via source gateway 114) to which the calling-party terminal 110 and/or source access node 116 connects to communicate to the transport network 150. The transport network 150 may also include or interface to a destination access system 122 (via a destination gateway 124) to which the called-party terminal 130 and/or the destination node 126 connects to the transport network 150.

When communicating with the transport network 150 via a source access node 116, the calling-party terminal 110 may communicate over a wired or wireless interface (hereinafter collectively referred to as the "first interface"). Similarly, when communicating with the transport network 150 via a destination access node 126, the calling party terminal 130 may communicate over another wired or wireless interface (hereinafter collectively referred to as the "second interface").

Known formats and protocols may be used for communicating over the first and second interfaces, the source access node 116, the transport network 150, and the destination access node 126. For example, the formats and protocols for communications over the wired portions of a communication channel formed from the first and second interfaces, the source access node 116, the transport network 150, and the destination access node 126 in a public or private network may be specified by the well known Advanced Intelligent Network ("AIN")/Signaling System 7 ("SS7"), other plain old telephone service ("POTS") protocols, Ethernet specification, and/or IEEE 802 standard. Details of the AIN specification may be found in Bellcore's AIN Release 0.1 and AIN Release 0.2, published between August 1992 and December 1992.

In the case of the wireless portion of the communication channel, the formats and protocols may be according to commonly used public wireless interface formats, such as Advanced Mobile Phone Service ("AMPS"), Time Division Multiple Access ("TDMA"), Global System for Mobile Communications ("GSM"), and Code Division Multiple Access ("CDMA"), Universal Mobile Telecommunications Service ("UMTS"), Wide-band CDMA ("WCDMA"), CDMA2000, Generic Packet Radio Services ("GPRS") and the like. In a private wireless network, the format of the wireless portion of the communication channel may be according to or based on the Telecommunications Industry Association ("TIA/EIA") IS-94 specifications, Bluetooth specification, IEEE 802.11 standards, and/or other wireless local area network specification, in addition to the formats and/or protocols of the public wireless and/or wireline networks.

In an exemplary embodiment, the calling-party and called-party terminals 110, 130 may be wired or wireless phones, personal digital assistants, personal computers, a caller-id terminal, combinations thereof and/or other network or telecommunication termination devices. Each of the calling-party and/or the called-party terminals 110, 130 have a subscriber address or identification code for identifying themselves to the communication network 100 and for providing an address to which calls may be terminated to. Each calling-party and called-party subscriber address and/or identification code (referred to hereinafter as "calling-party subscriber id" and "called-party subscriber id," respectively) may include characters that are permanently or, alternatively, dynamically assigned to the terminal on the occurrence of an event, such as initiation of services and/or registration with the communication network 100.

These characters may be unique so that each of the calling-party and/or the called-party terminals 110, 130 may be distinguished from each other. For example, the characters of each of the calling-party and called-party subscriber ids may be a dialed directory telephone number, a Mobile Identification Number ("MIN"), a Mobile Directory Number ("MDN"), a mobile station identifier ("MSID"), an Electronic Serial Number ("ESN"), a mobile equipment identifier ("MEID"), an Internet Protocol ("IP") address, a Medium Access Control ("MAC") address, a Session Initiation Protocol ("SIP") address, an e-mail address, and/or other suitable identifier.

Alternatively, the calling-party and called-party subscriber ids may be instead masquerades or proxies as to hide the subscriber ids of the calling-party and/or the called-party terminals 110, 130, but let calls be originated from or terminated to the terminals 110, 130. This may be carried out by translating the masquerades or proxies to subscriber ids (and vice versa) using a translation routine, such as network address translation. In addition to hiding the subscriber ids, this beneficially allows for pooling of calling-party and/or called-party subscriber ids for efficient subscriber id allocation. The efficiency is realized through dynamic assignment of the subscriber ids to the calling-party and/or the called-party terminals 110, 130, as needed.

The calling-party and/or called-party terminals 110, 130 may be associated with respective "home" networks, e.g., the source and destination access systems 112, 122, in which information about them is maintained in centralized repositories, such as calling-party and called-party repositories 118, 138. The calling-party repository 118 may contain the calling-party subscriber id, and a calling-party service profile that includes preference and/or capability information for the calling-party terminal 110.

The calling-party service profile may also indicate any standard and/or enhanced services, such as circuit-switched and/or packet-data caller ID services, circuit-switched and/or packet data call-waiting services, Custom Local Area Signaling Services ("CLASS"), services provided by TIA/EIA IS-764 Recommendation entitled "Enhancements For Wireless Calling Name Feature Descriptions," and the like, to which the calling-party terminal 110 may subscribe. In addition, when the calling-party terminal 110 is embodied as a wireless device, the calling-party service profile may include information for carrying out wireless communication, which may include, for example, the last reported location and the current status (e.g., active or inactive) of the calling-party terminal 110.

Likewise, the called-party repository 138 may contain the called-party subscriber id, and a called-party service profile that includes preference and/or capability information for the called-party terminal 130. The called-party service profile may also indicate any standard and/or enhanced services, such as those noted above, to which the called-party terminal 130 may subscribe. When the called-party terminal 110 is embodied as a wireless device, the called-party service profile may include information for carrying out wireless communication, which may include, for example, the last reported location and the current status (e.g., active or inactive) of the called-party terminal 130.

In addition, the calling-party and called-party terminals 110, 130 may be provisioned with respective calling-party and called-party ringtone-generation engines 110a, 130a for generating and playing respective ringback and ringing ringtones. The provisioning of the calling-party and called-party terminals 110, 130 may occur during manufacturing or at a later time, such as through a post-manufacturing push-type or pull-type download from a network node, such as a download server of the system 100 (not shown).

The ringtone-generation engine 130a may generate and play the ringing ringtone to indicate an incoming call to the called-party terminal 130. Given that the called-party terminal 130 may subscribe to enhanced services, such as call waiting, the ringtone-generation engine 130a may generate and play the ringing ringtone whether or not the called-party terminal 130 is engaged in an ongoing communication. On the other hand, the calling-party ringtone-generation engine 110a may generate and play a ringback ringtone at the calling-party terminal 110 during a ringing of a call at the called-party terminal 130.

Each of the ringtone-generation engines 110a 130a may be any object (i.e., software or hardware) that produces audio using information for generating ringtones ("ringtone information"). This object may be, for example, a MPEG Audio Layer 3 ("MP3") engine, a wave ("WAV:) engine, a musical-instrument-digital-Interface ("MIDI") engine or other tone generating engine that conforms to a standard or proprietary protocol designed for generating and playing synthesized music. While the ringtone-generation engines 110a, 130a may generate the ringing and ringback ringtones using information that represents musical sound directly, they may also generate the ringing and ringback ringtones by (i) converting non-musical information, e.g., text, into musical tones and/or (ii) using information about how to produce the ringing or ringback ringtones.

In the latter case, for example, the information may be represented by a musical notation or command set information that are stored locally in the calling-party or called-party terminals 110, 130 in or received from an external source (e.g., the communication network 100) by the ringtone generation engines 110a, 130a. The musical notation or command set information (collectively referred to hereinafter as "notation information") may include code for constructing or playing the ringtone. This code may be, for example, commands, data and/or parameters that cause the ringtone generation engines 110a, 130a to construct and/or play the tones of the ringtones in a desired sequence, pitch, score, key, tempo, timbre, tone, and/or using a desired instrumentation, orchestration, rhythm, harmonic, etc. The actual tones produced by the ringtone-generation engines 110a, 130a in accordance with the notation information may be generated using tones stored in tables (e.g., wavetables) in data stores 110b, 130b.

Alternatively, notation information might not include the commands, but rather include data and/or parameters, such as note-on indications, note-offs indications, pitch, score, key, tempo, timbre, tone, instrumentation, orchestration, rhythm, harmonics and the like. In this case, the commands for generating the ringtones may be stored in and obtained from the data stores 110b, 130b. As above, the actual tones produced by the ringtone-generation engines 110a, 130a in accordance with the notation information may be generated using the tones stored in and obtained from the tables in the data stores 110b, 130b.

In another alternative, the ringtone-generation engines 110a, 130a may generate the ringing and/or ringback ringtones using non-musical information, as noted above. As will be described in greater detail below, the ringtone-generation engines 110a, 130a may generate this information by converting the non-musical information, such as caller-ID text, into tones using mappings stored in respective data stores, such as the data stores 110b, 130b. These mappings may also be used with the notation information to facilitate generation of the ringing and ringback ringtones.

With respect to receiving the information from an external source, the ringing ringtone information (e.g., the direct musical information, the non-musical information, and the information about how to produce the ringing ringtones) may be provided to the ringtone-generation engine 130a from the destination access node 126 via the called-party terminal 130.

The called-party terminal 130 may receive this information from the destination access node 130 in response to the calling-party terminal 110 originating a call to the called-party terminal 130. Consequently, the destination access node 126 may be provisioned to provide such information to the called-party terminal 130, and the called-party terminal 130 may be provisioned to receive the information from the destination access node 126.

In one embodiment, the provisioning may be in the form of a standard or proprietary signaling or messaging, such as ANSI-41 and/or IS-95 signaling or SIP messaging. Such signaling or messaging allows the destination access node 126 to provide the ringing ringtone information to the called-party terminal 130 in the form of proprietary or standard formatted digital audio information, e.g., a digital audio record or file. The audio information may be sent to and received by the called-party terminal 130 in its own message or appended to another message, such as the well know caller-ID text message.

The form of the audio information may be, for example, MP3 data, WAV data, or other digital audio data. Such other digital audio data may be coded using a codec such as the Pulse Code Modulation ("PCM") codec, the Adaptive Differential Pulse Code Modulation ("ADPCM") codec, the Code-Excited Linear Predictive ("CELP") codec, the Relaxed Code-Excited Linear Predictive ("RCELP") codec, the Linear Predictive Coding ("LPC") codec, the Adaptive Code-Excited Linear Predictive ("ACELP") codec, the CDMA Qualcomm Code-Excited Linear Predictive ("QCELP") codec, the Enhanced variable rate ("EVRC") codec, the Selective Mode Vocoder ("SMV") codec, the CDMA4000-SMV codec, the Adaptive Multirate GSM ("AMR-GSM") codec, the Improved Multiband Excitation ("IMBE") codec, the Sinusoidal Transform Coder ("STC") codec, the Federal Standard 1017, the IS-54, the IS-641, and the like.

However, the format of the audio information may be dictated, in part, on the capabilities and preferences of the called-party terminal 130. Thus, before providing the audio information, the destination access node 126 (or other network node in communication with the destination access node) may query or have the called-party terminal 130 and/or the central repository 138 report the capabilities and preferences of the called-party terminal 130. The capabilities and preferences may be requested by or reported using a proprietary or standard reporting protocol. If, for example, the call is a wireless or packet based call, then the reporting protocol may be according to the Composite Capabilities/Preferences Profiles ("CC/PP") Recommendation from the World Wide Web Consortium ("W3C"). The CC/PP was last published by the W3C as a Recommendation on 15 Jan. 2004, and is available only on the Internet at www.w3.org.

Instead of being digital audio, the audio information may be in the form of Dual-Tone MultiFrequency ("DTMF") audio signals. Consequently, the called-party ringtone-generation engine 130a may be configured to generate and play the ringing ringtone using the DTMF audio signals.

In another embodiment, the destination access node 126 (like the called-party terminal 130) may be provisioned to support any standard and/or enhanced services, such as circuit-switched and/or packet-data caller ID services, circuit-switched and/or packet data call-waiting services, CLASS, TIA/EIA IS-764 Recommendation, and the like. As such, the destination access node 126 may produce and forward to the called-party terminal 130 textual calling-party identification ("textual caller-id") information using the well known caller-ID text services or some variation thereof.

Such services are used to provide the calling-party subscriber id to the called-party terminal 130 when a call is terminated to the called-party terminal 130. Given the destination access node 126 may be provisioned to support the enhanced services, such as call waiting, the caller-ID text may be sent to the called-party terminal 130 whether or not the called-party terminal 110 is engaged in an ongoing communication.

In yet another embodiment, the provisioning may be in the form of a standard or proprietary signaling or messaging system, as noted above, so as to allow the destination access node 126 to provide the ringing ringtone information in the form of the notation information. To facilitate this, the destination access node 126 may query or otherwise request from a data store 120 the notation information, which was previously stored in the data store 120 by a party associated with the calling-party terminal 110 (e.g., a subscriber, carrier, or other interested party). After receipt, the destination access node 126 may send the notation information to the called-party terminal 130. This information may be carried in its own message or appended to another message, such as the well know caller-ID text message.

The ringback ringtone information (e.g., the direct musical information, the non-musical information, and the information about how to produce the ringback ringtones) may be provided to the ringtone-generation engine 110a from the source access node 116 via the calling-party terminal 110. The calling-party terminal 110 may receive this information from the source access node 116 in response to the calling-party terminal 110 originating a call to the called-party terminal 130. Consequently, the source access node 116 may be provisioned to provide such information to the calling-party terminal 110, and the calling-party terminal 110 may be provisioned to receive the information from the source access node 116.

In one embodiment, this provisioning may be in the form of a standard or proprietary signaling or messaging, such as ANSI-41 and/or IS-95 signaling or SIP messaging, so as to allow the source access node 116 provide the ringback ringtone information to the calling-party terminal 130 in the form of the proprietary or standard formatted digital audio information, such as those noted above. The audio information may be sent to and received by the calling-party terminal 110 in its own message or appended to another message.

Like the digital audio information discussed above, the format of the audio information for the calling-party terminal 110 may be dictated, in part, on its capabilities and preferences. Thus, before providing the digital audio information, the source access node 116 or other network node in communication with the source access node (not shown) may query or have the calling-party terminal 110 and/or the calling-party repository 118 report the capabilities and preferences of the calling-party terminal 110. As above, the capabilities and preferences may be requested by or reported using a proprietary or standard reporting protocol, such as the CC/PP Recommendation.

The audio information may also be in the form of Dual-Tone MultiFrequency audio signals instead of a digital audio format. Consequently, the calling-party ringtone-generation engine 110a may be configured to generate and play the ringing ringtone using the Dual-Tone MultiFrequency audio signals.

In another embodiment, the source access node 116 (like the calling-party terminal 110) may be provisioned to support any standard and/or enhanced services, such as circuit-switched and/or packet-data caller ID services, circuit-switched and/or packet data call-waiting services, CLASS, TIA/EIA IS-764 Recommendation, and the like. The source access node 116 may also be provisioned to provide a reverse-type caller ID services so as to provide the called-party subscriber id and/or the calling-party subscriber id back to the calling-party terminal 110.

As such, the source access node 116 may produce and send, for example, textual versions of the called-party and/or the calling-party subscriber ids back to the calling-party terminal 110. Given that the information is sent in response to the origination of a call to the called-party terminal 130, the information may be sent to the calling-party terminal 110 while engaged in the ongoing communication.

The provisioning may also be in the form of standard or proprietary signaling or messaging that allow the source access node 116 to provide the information for generating the ringback ringtone in the form of the notation information. To facilitate this, the source access node 116 may query or otherwise request the notation information from a data store, such as data store 120 or data store 124. The notation information may be previously stored in the data store 120 or data store 124 by a party associated with the calling-party terminal 110 and/or a party associated with the called-party terminal 110. After receipt, the source access node 116 may send the notation information to the calling-party terminal 110. The notation information may be sent in its own message or appended to another message.

2. Exemplary Operation

Figure 2:
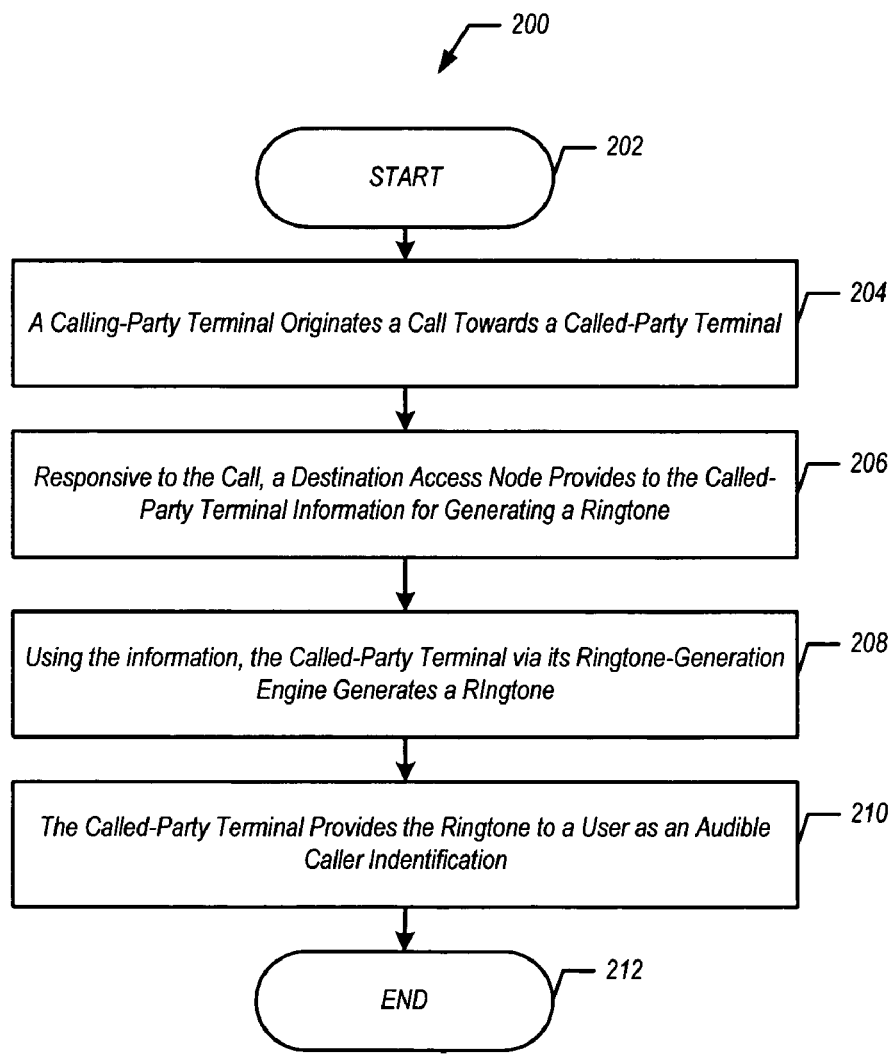
FIG. 2 is a first flow chart illustrating a flow for carrying out an audible-calling-party identification service in accordance with an exemplary embodiment.

FIG. 2 is a flow chart illustrating a flow 200 for carrying out an audible-Caller-ID service in accordance with an exemplary embodiment. This audible-Caller-ID service allows the calling-party terminal 110 to audibly identify itself to the called-party terminal 130 using a ringing ringtone, thereby enabling a user of the called-party terminal 130 to identify the calling party. The ringing ringtone may be provided in addition to or in lieu of caller ID text messaging. The flow 200 is described in reference to the architecture of the communication system 100. Although, the flow 200 may be carried out in most any network.

At block 202, the flow 200 is started. The calling-party terminal 110 originates a call or otherwise transmits an origination request towards the called-party terminal 130, as shown in block 204. The origination request may be sent, for example, to the source access node 116 over the first interface. The source access node 116, in turn, may forward the request to the destination access node 126 via the transport network 150, the first and second access networks 112, 122 and the first and second gateways 114, 124.

Responsive to the origination request and typically after call setup (i.e., the well known functions to establish a call), the destination access node 126 provides to the called-party terminal the ringtone information, as shown in block 206. This information may be the direct musical information, the non-musical information, and/or the information about how to produce the ringtones, as noted above. The destination access node 126 may send the information to the called-party terminal 130 over the second interface. In addition to providing the information for generating the ringtone, the destination access node 126 may also terminate caller-ID text message to the called-party terminal 130 either separate from or in combination with the ringtone information. In the latter situation, for example, the ringtone information may be included with or appended to a DISPTEXT parameter of TIA/EIA IS-764. Details of the DISPTEXT parameter may be found in section 5 under the heading "6.5.2.bx DisplayText."

After receipt of the information, the called-party terminal 130 passes the ringtone information to its ringtone-generation engine 130a to generate a ringing ringtone, as shown in block 208. In turn, the called-party terminal 130, using the ringtone-generation engine 130a, provides the ringing ringtone to a user of the called-party terminal as an audible caller ID, as shown in block 210. The called-party terminal 130 may provide the ringing ringtone to the user by, for example, playing the ringing ringtone on an external and/or earpiece speaker. At block 212, the flow 200 ends, and at sometime thereafter the destination access node 126 may terminate the call to the called-party terminal 130, if the called-party terminal 130 answers or "goes off hook."

Figure 3:
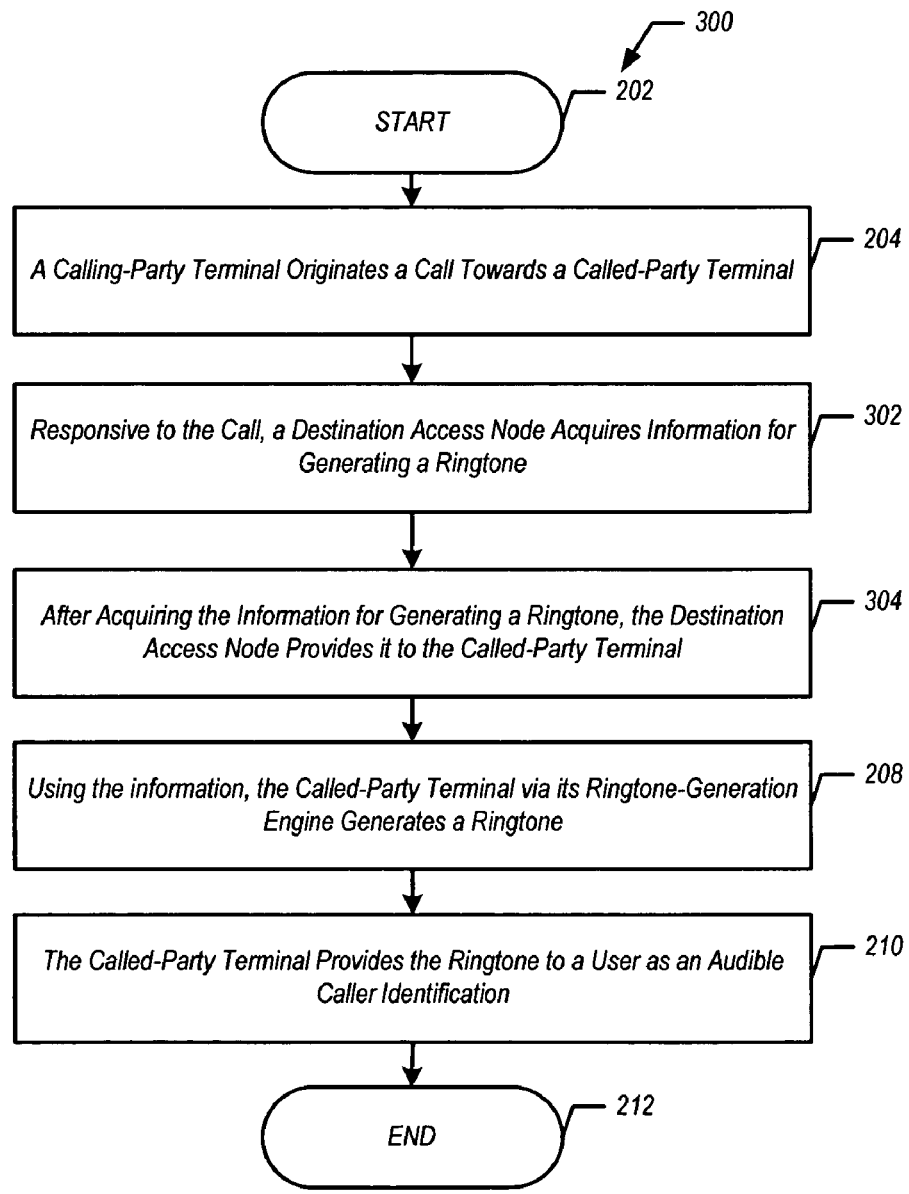
FIG. 3 is a second flow chart illustrating a flow for carrying out an audible-calling-party identification service in accordance with another exemplary embodiment.

Referring now to FIG. 3, a flow chart illustrating a flow 300 for carrying out an audible-Caller-ID service in accordance with another exemplary embodiment is shown. Like flow 200 (FIG. 2), this audible-Caller-ID service allows the calling-party terminal 110 to audibly identify itself to the called-party terminal 130 using a ringing ringtone, thereby enabling a user of the called-party terminal 130 to identify the calling party. The ringing ringtone may be provided in addition to or in lieu of caller-ID text messaging. The flow 300 is described in reference to the architecture of the communication system 100; although, it may be carried out in most any network.

Responsive to the origination request in block 204 and typically after call setup, the destination access node 126 acquires the ringtone information, as shown in block 302. This information may be the direct musical information, the non-musical information, and the information about how to produce the ringtones, as noted above. The destination access node 126 may, for example, acquire the ringtone information by developing, via its enhanced service provisioning, textual calling-party identification information using the subscriber id of the calling-party terminal.

Alternatively, the destination access node 126 may acquire the information by obtaining it from the data store 120. To do this, the destination access node 126 may query for or otherwise request delivery of the ringtone information from the data store 120. The query or request may be carried out through standard or proprietary signaling or messaging (e.g., SS7 and/or IS-41 signaling, and/or SIP messaging) between destination access node 126, the data store 120 and other elements of the communication network 100.

As another alternative, the destination access node 126 may receive the information from data store 120 using a push-type distribution technology instead of pulling the ringtone information from the data store 120. That is, the destination access node 126 receives the ringtone information from the data store 120 not as a result of a request, but rather as a triggering event, such as the origination request. The push-type distribution technology may use standard or proprietary signaling or messaging to carry out the transfer of the ringtone information among the destination access node 126, the data store 120 and the other elements of the communication network 100.

After acquiring the information in block 302, the destination access node 126 may provide the ringtone information to the called-party terminal 130, as shown in block 304. The destination access node 126 may do this by transmitting the ringtone information over the second interface using standard or proprietary signaling or messaging. If the ringtone information is the caller-ID text, then the destination access node 126 may use the standard signaling or messaging for the caller-ID text messaging.

If the ringtone information is not textual calling-party identification information, then the destination access node 126 may also terminate textual calling-party identification information to the called-party terminal 130 in combination with or separate from the ringing ringtone information. After providing the ringing ringtone information to the called-party terminal 130, the flow 300 then transitions to block 208. Then the flow 300 continues as described above and illustrated in FIG. 2.

Figure 4:
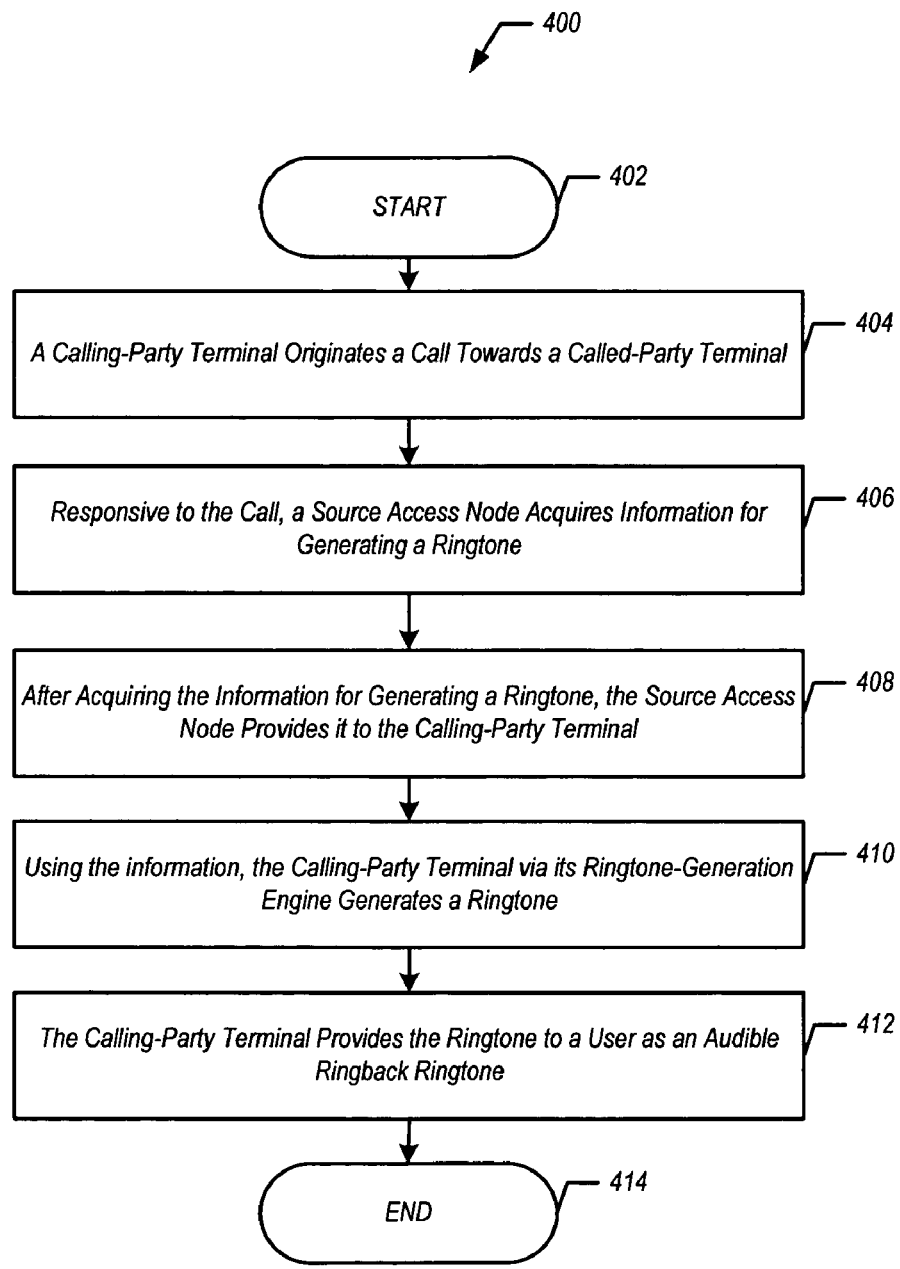
FIG. 4 is a third flow chart illustrating a flow for carrying out an audible audible-calling/called-party-ringback service in accordance with another exemplary embodiment.

FIG. 4 is a flow chart illustrating a flow 400 for carrying out an audible ringback service in accordance with another exemplary embodiment. The audible ringback service allows the calling-party terminal 110 to receive a ringback ringtone that is associated with either the calling-party terminal 110 or the called-party terminal 130. This enables a user of the calling-party terminal 130 to hear a ringback ringtone associated with either party during a ringing portion of a call originated to the called-party terminal 130. The flow 400 is described in reference to the architecture of the communication system 100; although, it may be carried out in most any network.

At block 402, the flow 400 is started. The calling-party terminal 110 originates a call or otherwise transmits an origination request towards the called-party terminal 130, as shown in block 404. Like above, the origination request may be sent, for example, to the source access node 116 over the first interface. The source access node 116, in turn, may forward the request to the destination access node 125 via the transport network 150, the first and second access networks 112, 122 and the first and second gateways 114, 124.

Responsive to the origination request in block 404 and typically after call setup, the source access node 116 acquires the ringtone information for generating the ringback ringtone, as shown in block 406. This information may be the direct musical information, the non-musical information, and/or the information about how to produce the ringback ringtones, as noted above. The source access node 116 may, for example, acquire the ringtone information by developing, via its reverse-type caller ID services provisioning, textual calling-party or textual called-party identification information using the calling-party or called-party subscriber ids, respectively.

Alternatively, the source access node 116 may acquire the information by obtaining it from the data store 120 or data store 124. The source access node 126 may do this by querying for or otherwise requesting delivery of the ringtone information from either the data store 120 or the data store 124. The query or request may be carried out through standard or proprietary signaling or messaging (e.g., SS7 and/or IS-41 signaling, and/or SIP messaging) between source access node 126, the data stores 122, 124 and the other elements of the communication network 100.

The source access node 116 may receive the information from data stores 122, 124 using the push-type distribution technology as noted above. Like above, the triggering event may be the origination request. The push-type distribution technology may use standard or proprietary signaling or messaging to carry out the transfer of the information among the source access node 116, the data stores 122, 124, and other elements of the communication network 100.

After acquiring the ringtone information in block 406, the source access node 116 may provide the ringtone information to the calling-party terminal 110, as shown in block 408. The source access node 116 may do this by transmitting the ringtone information over the first interface using standard or proprietary signaling or messaging. If the ringtone information is textual calling-party or called-party identification information, then the source access node 116 may use standard or proprietary signaling or messaging for the textual reverse-type calling-party and/or called-party identification information.

After providing the ringtone information to the calling-party terminal 110, the flow 400 then transitions to block 410. At block 410, the calling-party terminal 110 passes the ringtone information to its ringtone-generation engine 110a to generate a ringback ringtone. In turn, the calling-party terminal 110, using the ringtone-generation engine 110a, provides the ringback ringtone to a user of the calling-party terminal as an audible ringback ringtone, as shown in block 412. The calling-party terminal 110 may then provide the ringback ringtone to the user by, for example, playing the ringback ringtone on an external and/or earpiece speaker. At block 414, the flow 400 ends, and at sometime thereafter the destination access node 126 may terminate the call to the called-party terminal 130, if the called-party terminal 130 answers or "goes off hook." And if the called-party terminal 130 answers, the ringback ringtone terminates.

3. Ringtone Generation Using Mappings

Using the ringtone information and mappings stored in the data stores 110a, 130a, the calling-party and/or called-party ringtone generators 110a, 130a may construct aesthetically pleasing or, alternatively, dissonant ringtones. Given that the calling-party and/or called-party ringtone generators 110a, 130a may be identical device or at least carry out the same or similar functions, the following refers to only the called-party ringtone generator 130a and ringing ringtone for simplicity. Those skilled in the art will realize, however, that the following is equally applicable to the calling-party ringtone generator 110a and ringback ringtone.

To facilitate construction of the ringing ringtone, the called-party ringtone generator 130a may obtain from the data store 130b one or more mappings for converting the ringtone information into the aesthetically pleasing or dissonant ringtones. These mappings may include musical-scale mappings, melodic mappings, musical sequence mappings, and/or other tonal mappings. Each of these mappings may map a tonal instance (e.g., a single note, multiple notes, scales and/or melodies) to information that is expected to be included in the ringtone information (hereinafter referred to as "expected information").

For example, the musical-scale mappings may include a C-Major scale mapping in which notes of a C-Major scale are mapped to data (e.g., characters, digits, notation and the like) contained within the expected information. The C-Major scale, as those skilled in the art know, contains seven notes within one octave, namely, notes C, D, E, F, G, A, and B. Given that the notes of C-Major scale (as with all scales) are repeated in each octave, the scale may be extended by additional notes to correspond to the amount of data in the expected information.

If, for example, the expected information includes 10 digits, then the C-Major scale mapping may be extended to ten notes into a second octave to form a ten-note scale that includes C, D, E, F, G, A, B, C2, D2, and E2, where the C2, D2, and E2 are notes in the second octave. This second octave may be adjunct to the first octave, but need not be. One possible C-Major scale mapping is shown in Table 1 below in which the ten-note scale C-Major scale is mapped to 10 digits of the expected information, which may be representative of digits used to form a dialed directory phone number.

TABLE 1

| | DIGITS | | | | | | | | | |
|---|---|---|---|---|---|---|---|---|---|---|
| | 0 | 1 | 2 | 3 | 4 | 5 | 6 | 7 | 8 | 9 |
| NOTES | C | D | E | F | G | A | B | C2 | D2 | E2 |

To construct the ringing ringtone, the called-party ringtone generator 130a may apply one or more of its mappings, such as the musical sequence mapping, to the ringing ringtone information. This way, when the ringtone information is received, the called-party ringtone generator 130a may generate the ringtone based on the mapped relationship between the musical sequence and the ringtone information. For example, if the ringtone information is textual calling-party identification in which the subscriber id is a dialed directory information phone number such as 555-867-5309, then, using the map of Table 1, the called-party ringtone generator 130a may produce a ringtone having the musical sequence A, A, A, D2, B, C2, A, F, C, and E2.

One advantage of using such a mapping (or another mapping that has a one to one relationship between the musical notes and the expected information) is that no two ringing ringtones will be the same for unique subscriber ids, such as the dialed directory number Thus, if the calling-party terminal 110 calls a number of called-party terminals, each called-party terminal will experience the same ringing ringtone for the calling-party terminal. On the other hand, mappings that do not maintain a one to one relationship may be configured to provide a more aesthetically pleasing or other desired ringing ringtone at the expense of uniqueness. In this case, each called-party terminal will experience the same ringing ringtone for the calling-party terminal, but other calling-party terminals may have the same ringing ringtone.

As alternative to producing a musical sequence mapping, the called-party ringtone generator 130a may construct a ringing ringtone in the form of a chord or set of chords using a chord mapping. To do so, the called-party ringtone generator 130a may construct the ringing ringtone using one or more attributes of the ringtone information. That is, the called-party ringtone generator 130a may construct the ringing ringtone using attributes of the direct musical information, the non-musical information, and the information about how to produce the ringing ringtones. These attributes may be, for example, individual notes, DTMF audio signals, characters and/or digits of the calling-party subscriber id, location information associated with the calling-party subscriber id, the parameters of the notation information, and the like.

As above, to facilitate the creation of the ringing ringtone, the called-party ringtone generator 130a may query and receive from the data store 130b for one or more of the tonal mappings. While almost any tonal mapping may be used, in this example, the tonal mapping is the C-Major scale mapping, which contains the notes C, D, E, F, G, A, and B as noted above.

In the C-Major scale, the C note is considered the "first" tone, the E note is considered a "major third" tone, and the G note is considered as "perfect fifth" tone. By combining the first, major third, and perfect fifth tones, the called-party ringtone generator 130a may produce a C-E-G major triad chord. The called-party ringtone generator 130a may also add a fourth note to the C-E-G major triad chord, such as the B note so as to produce a C-E-G-B chord. The B note is commonly referred to as a "major seventh" tone. Such addition typically makes the C-E-G-major triad chord feel more "jazzy" or "open."

The called-party ringtone generator 130a may annotate or transform the C-Major scale mapping into a chord map that associates the attributes of the ringtone information with the musical notes for forming the C-E-G and/or the C-E-G-B chords. For example, the chord map may associate three octaves of C, E, G, and B notes with the digits or characters of the calling-party subscriber id.

One possible chord map is shown in Table 2 below. In this chord map, C2, E2, G2, and B2 are notes in the second octave, and C3 and E3 are notes in the third octave. While the second octave may be adjunct to the first octave, and the third octave may be adjunct to the second octave, the octaves need not be contiguous or in any particular order.

TABLE 2

| | DIGIT | | | | | | | | | |
|---|---|---|---|---|---|---|---|---|---|---|
| | 0 | 1 | 2 | 3 | 4 | 5 | 6 | 7 | 8 | 9 |
| NOTE | C | E | G | B | C2 | E2 | G2 | B2 | C3 | E3 |

Using the chord map, the called-party ringtone generator 130a may construct the ringtone by assigning to one or more, and preferably, each of the attributes of the ringtone information (e.g., digits, and/or characters of the calling-party subscriber id) a corresponding note. Based on Table 2, the ringing ringtone for the subscriber id embodied as the dialed directory number 555-867-5309 may, for example, be formed into the chord having the notes E2, C, B, G2, B2, and E3. Thus, when delivering the ringing ringtone to the user of the called-party terminal 130, the called-party ringtone generator 130a may play all of the notes of the chord in unison as opposed to sequentially.

As an alternative to a single chord map, the called-party ringtone generator 130a may transform a musical-sequence mapping into a multi-chord mapping. For instance, the called-party ringtone generator 130a may annotate or transform the C-Major scale mapping into include three chord groupings, namely, C Major, G Major (inverted), and A Minor groupings, as shown in Table 3 below.

TABLE 3

| | DIGITS | | | | | | | | | |
|---|---|---|---|---|---|---|---|---|---|---|
| | 0 | 1 | 2 | 3 | 4 | 5 | 6 | 7 | 8 | 9 |
| Notes | C | E | G | C2 | G2 | B2 | D | A | C3 | E2 |
| | C Major | | | G Major (inverted) | | | | A Minor | | |

When constructing the ringing ringtone using chord groupings, such as those in Table 3, the called-party ringtone generator 130a may assign a chord to each digit or any number of digits that fall within the chord grouping. The chords may then be associated to each other, e.g., concatenated, to allow the chords to be played sequentially. By way of example, the called-party ringtone generator 130a may transform the calling-party subscriber id, which is embodied as the dial directory number 555-867-5309, in the following melodic chord sequence.

First, the called-party ringtone generator 130a may transform the "555" portion (i.e., the area code portion of the phone number) into a single G Major (inverted) chord, i.e., notes G2, B2, and D. And then, appended to the G Major (inverted) chord is (i) an A Minor chord for the "8" digit, (ii) a G Major (inverted) chord for the "6" digit, (iii) an A Minor chord for the "7" digit, (iv) a G Major (inverted) chord for the "5" digit, (v) a C-Major chord for the "3" and "0" digits, and (vi) an A Minor chord for the "9" digit. Once this ringing ringtone is constructed, the called-party ringtone generator 130a may play the 7 chords sequentially to the user of the called-party terminal 130. Like above, without the one to one mapping and a unique subscriber id, the ringing ringtone might not be unique for each calling-party terminal 110.

In each of the above embodiments as well as embodiments with the scope of the present invention, the called-party ringtone generator 130a may store the ringing ringtone in a ringing ringtone file in memory, such as data store 130b, after constructing the ringtone. This allows the called-party ringtone generator 130a to avoid having to reconstruct the ringtone each time the calling party calls the called party. Rather, when the called-party ringtone generator 130a receives the ringing ringtone information, it may first query the data store 130b for the ringtone file before constructing the ringing ringtone.

The number of ringing ringtones that are stored may be a function of the amount of available memory. If the amount of available memory is limited, then the called-party ringtone generator 130a may use a priority schema based on, for example, the frequency of calls by the calling party to determine whether to store the ringtone in memory. Other priority schemes, such as roll-over, first-in/first out schemes, may be used as well.

As noted above, the mappings may be used in combination with the notation information received by the called-party ringtone generator 130a. Since the mappings are maintained locally, they may contain the actual tones (in, e.g., the form of wavetables) used by the called-party ringtone generator 130a to generate the ringing ringtone. This way, responsive to the notation information, the called-party ringtone generator 130a may obtain one or more of the mappings from the data store 130b to generate the ringing ringtone in accordance with the notation information. For example, the called-party ringtone generator 130a may obtain from the data store 130b one or more tonal mappings to use as the actual tones for producing the ringing ringtones to satisfy the notation information parameters, such as the note-on indications, note-off indications, pitch, key, tone, and harmonics.

4. Ringtone Variations

Figure 5:
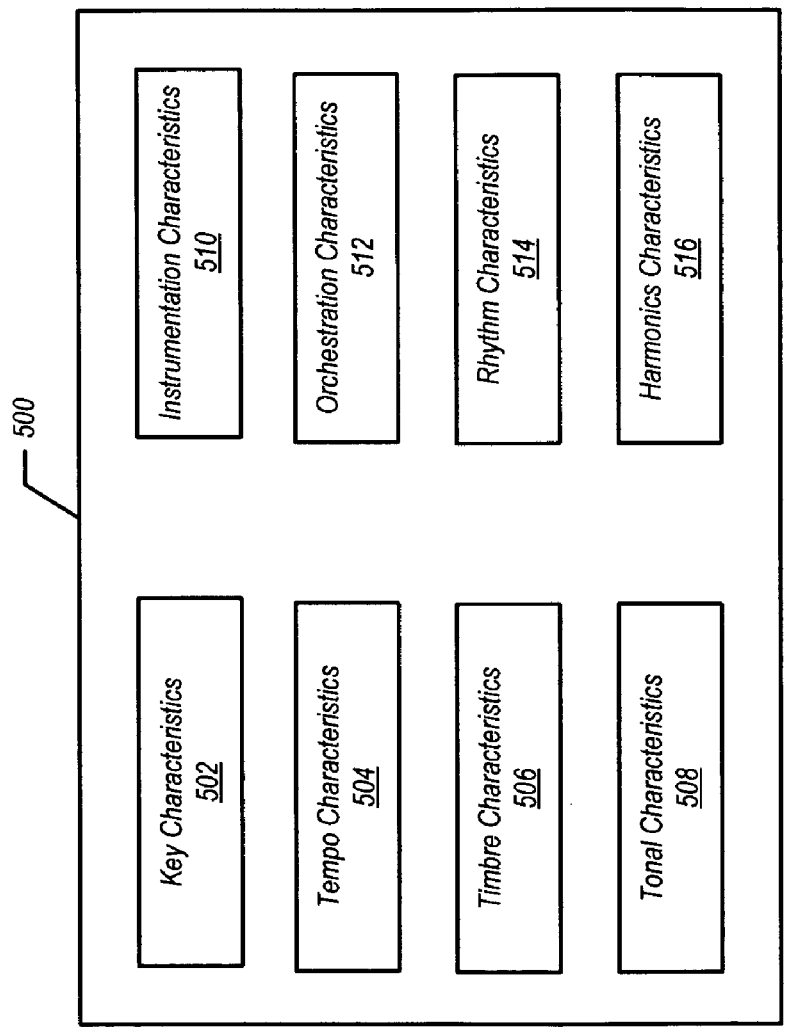
FIG. 5 is a chart showing a battery of musical characteristics that may be used to add stylistic and/or personal preferences to an audible-calling-party identification service and/or an audible-calling/called-party-ringback service, both of which are accordance with an exemplary embodiment.

FIG. 5 is a chart showing a battery of characteristics 500 that may be applied to the ringtone information to add a layer of stylistic and/or personal preferences onto the ringing and/or ringback ringtones. These stylistic and/or personal preferences, however, are not intended to change underlying sequencing or pattern of the ringing and ringback ringtones.

Each of the calling-party and called-party terminals 110, 130 may have its own battery of characteristics 500. As such, the battery of characteristics 500 in the calling-party terminal 110 may be stored as a record 110c in the data store 110b. The battery of characteristics 500 of the called-party terminal 130 may be stored as a record 130c in the data store 130b.

In either case, the battery 500 may include musical key characteristics 502, tempo characteristics 504, timbre characteristics 506, tonal characteristics 508, instrumentation characteristics 510, orchestration characteristics 512, rhythm characteristics 514, and harmonics characteristics 516. Each of the characteristics 502-516 may contain code (i.e., commands and/or data) or musical notation to change the characteristics of the ringtones in accordance with desired stylistic and/or personal preferences.

Combinations of the characteristics 502-516 may be applied in random, algorithmic, or traditional patterns. By applying traditional patterns, for example, the calling-party and/or called-party ringtone generators 110a, 130a may produce different styles or genres of music, such as Rock, Jazz, Latin, or Baroque. The particular styles or genres in which the ringing and/or ringback ringtone is rendered may be determined by the calling party, the called party, and/or one of the network elements of communication network 100.

Preferably, however, the called party may be the most appropriate party to assign such styles or genres to the ringtone information. This is because the called party is the last to control an incoming call, and thus, can logically apply the stylistic and/or personal preferences at the expense of any previously assigned preferences. Further, the ability to control and/or personalize the behavior of the called-party terminal is valuable to its user, and although, the audible-Caller-ID and audible ringback services effectively remove some of this control, the ability to control the stylistic and personal preferences restores some of this lost control. Moreover, conveying the notational information, which may include stylistic and personal preferences, uses more resources, from a calling party to a called party is less efficient and is more difficult than simply conveying the non-notational information.

The application of the stylistic and/or personal preferences to the ringtone information may be illustrated in the following examples. For simplicity, the following examples are described with reference to the called-party ringtone generator 130a and ringing ringtone. Those skilled in the art will realize, however, that the following examples may be equally applicable to the calling-party ringtone generator 110a and ringback ringtone.

Moreover, those skilled in the art will realize that the called-party terminal 130 may specify and apply the same or, alternatively, different stylistic and/or personal preferences for each set of ringtone information associated with the calling-party terminal 110 and other calling-party terminals (not shown). Similarly, those skilled in the art will realize that the calling-party terminal 110 may specify and apply the same or, alternatively, different stylistic and/or personal preferences for each set of ringtone information associated with itself, the called-party terminal 130 and other called-party terminals (not shown).

After receipt, the called-party ringtone generator 130a may interrogate the ringtone information to determine the musical key for generating the ringing ringtone. Assume for this example that the musical key specified by the ringtone information is the C-Major key. Prior to generating the ringtone, however, the called-party ringtone generator 130a may obtain the musical key characteristics 502 from the records 130c. Also assume in this example that the desired musical key specified in the musical key characteristics 502 is a C-Minor key, which produces a "darker" feeling than a C-Major key.

Using the musical key characteristics 502, the called-party ringtone generator 130a may request from the data store 130b one of the tonal mappings that contains a C-Minor scale mapping instead of the C-Major scale mapping. The C-Minor scale, as those skilled in the art know, contains seven notes within one octave, namely, notes C minor, D diminished, E flat (or D sharp), F minor, G minor, A flat (G sharp), and B flat (A sharp). As above, the notes of the C-Minor scale are repeated in each octave, and thus the C-Minor scale may be extended by additional notes to correspond to the amount of data in the expected information.

When, for example, the expected information includes 10 digits, then the C-Minor scale mapping may be extended to ten notes into a second octave to form a ten-note scale that includes C minor, D diminished, E flat (or D sharp), F minor, G minor, A flat (G sharp), and B flat (A sharp), C2 minor, D2 diminished, and E2 flat, where the C2 minor, D2 diminished, and E2 flat are notes in the second octave. This second octave may be adjunct to the first octave, but need not be. One possible C-Minor scale mapping is shown in Table 4 below in which the ten-note scale C-Minor scale is mapped to 10 digits of the expected information.

TABLE 3

| | Digits | | | | | | | | |
|---|---|---|---|---|---|---|---|---|---|
| | 0 | 1 | 2 | 3 | 4 | 5 | 6 | 7 | 8 | 9 |
| Note | C minor | D diminished | E flat major | F minor | G minor | A flat major | B flat | C2 minor | D2 diminished | E2 flat major |

By applying the C-Minor scale mapping instead of the C-Major scale mapping, the called-party ringtone generator 130a may to construct the ringing ringtone having the desired "darker" feeling. If, for example, the ringtone information is caller-ID text for the dialed directory information phone number such as 555-867-5309, then, using the mapping of Table 4, the called-party ringtone generator 130a may produce a ringtone having the musical sequence C minor, C minor, C minor, D2 diminished, B flat, C2 minor, A flat, F minor, C minor, and E2 flat.

Other characteristics may be applied in the same way. For instance, in addition to or on lieu of the obtaining the musical key characteristics 502, the called-party ringtone generator 130a may obtain from the records 130c the instrumentation and/or orchestration characteristics 510, 512.

Using the instrumentation characteristics 510, which includes code for applying one or more instruments to the ringtone information, and/or the orchestration characteristics 512, which includes code for orchestrating the instruments specified in the instrumentation characteristics 510, the calling-party terminal 110 may construct a ringtone in the style of a Jazz band, a flute solo, or any other resulting combination of instruments and orchestration. Like above, the instrumentation characteristics 510 and the orchestration characteristics 512 may override any instrumentation and orchestration characteristics specified in the ringtone information associated with the calling-party terminal 110.

In addition to the called-party terminal, other called-party terminals can apply their own stylistic and/or personal preferences to the ringtone information provided by the calling-party terminal 110 via their respective ringtone generators. Thus, the other called-party terminals may each experience their desired styles and preferences for ringing ringtone for calls originated from the calling-party terminal 110. As noted above, however, the underlying sequencing or pattern of the ringing ringtones is not altered.

Assume, for example, that the user of the called-party terminal 130 specifies as a preferred style for the calling-party terminal 110 a "Rock" genre in the key of C-Major. Thus, after receiving ringtone information in the form of a subscriber id embodied as 999-555-2424, the called-party ringtone generator 130a constructs and plays the ringing ringtone as A-A-A-G-G-G-C-E-C-E in the style of a rock band, with appropriate instruments, tempo, rhythm, etc.

Instead of a Rock genre, assume that another called-party terminal specifies as a preferred style for the calling-party terminal 110 a "String Quartet" genre in the key of C-Minor. When this other called-party terminal receives the ringtone embodied as 999-555-2424, its called-party ringtone generator constructs and plays the ringing ringtone as E flat-E flat-E flat-A flat-A flat-A flat-E flat-G-E flat-G in the style of a String Quartet band, with appropriate instruments, tempo, rhythm, etc.

5. Conclusion

In the foregoing detailed description, numerous specific details are set forth in order to provide a thorough understanding of exemplary embodiments described herein. However, it will be understood that these embodiments may be practiced without the specific details. In other instances, well-known methods, procedures, components, and structural entities have not been described in detail, so as not to obscure the foregoing description.

In view of the wide variety of embodiments to which the principles of the present invention can be applied, it should be understood that the illustrated embodiments are exemplary only, and should not be taken as limiting the scope of the present invention. For example, in addition to the embodiments disclosed above, the ringtone information may include attributes corresponding to a geographic region or location of the calling party. This geographic region or location of the calling party may be derived, for instance, from the NXX portion or area code portion of a dialed directory telephone number when the ringtone information is embodied as such.

Using the location information, the calling-party and/or the called-party ringtone generation engines 110a, 130a may generate a ringtone that includes a reference to the location information. Thus, when the called party receives a call from the calling party, who is in Dallas, Tex., the called-party ringtone generation engine 130a may construct ringing ringtone that includes the phrase "You have a call from Texas." The called-party ringtone generation engine 130a may then play the phrase using synthesized speech or song. Further, a visual display could be used to simultaneously display the location information.

In addition, the audible-caller-ID and calling-party or called-party ringback services may be integrated with or otherwise combined with a local address book or directory to extend the functionality of the services. For example, when the ringtone information matches an entry in the local address book or directory, the calling-party and/or the called-party ringtone generation engines 110a, 130a may incorporate the information from local address book or directory into the ringtone. This information may be, for instance, the name of the calling party. And thus, the called-party ringtone generation engines 130a may generate a ringtone that includes a phrase, such as "You have a call from [name of calling party]." This phrase may be superimposed over or appended to the ringtone.

In these and the other embodiments described above, the nodes, terminal, devices, ringtone generators and systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigured or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Furthermore, the method steps described herein may be taken in sequences other than those described, and more or fewer elements may be used in the block diagrams. The embodiments disclosed are for exemplary purposes only and other embodiments may be employed in lieu of or in combination with of the embodiments disclosed. Further, the claims should not be read as limited to the described order or elements unless stated to that effect. Therefore, all embodiments that come within the scope and spirit of the following claims and equivalents thereto are claimed as the invention.

What is claimed is:

1. In a network having a source node, a network node and a destination node, wherein the destination node is equipped with a ringtone-generation engine to generate a ringtone, wherein the ringtone comprises at least one audible tone, a method for providing an audible calling party identification comprising:

the destination node receiving from the network node information for producing a ringtone, wherein the information is originated toward the destination node in response to the source node initiating a call to the destination node, wherein the information comprises a sequence of characters, wherein the sequence of characters comprises a unique set of characters defining textual calling party identification information;

the destination node generating the ringtone using its ringtone-generation engine and the information, wherein the destination node includes a mapping for converting the information into a ringtone, and wherein the step of the destination node generating the ringtone comprises the ringtone-generation engine generating the ringtone by applying the mapping to the information, wherein applying the mapping to the information comprises referring to the mapping to respectively convert each of a plurality of individual characters of the sequence to a corresponding tonal instance comprising at least one of (i) a single musical note, (ii) multiple musical notes, (iii) a musical chord, (iv) scales and (v) melodies, so as to thereby establish corresponding tonal instances, and wherein the step of the destination node generating the ringtone comprises the ringtone-generation engine generating the ringtone by converting all of the characters of the sequence to tones so as to generate a unique ringtone; and the destination node providing the ringtone as the audible calling party identification by playing out at least the established tonal instances.

2. The method of claim 1, further comprising the destination node applying a musical key characteristic when converting the individual characters to corresponding tonal instances.

3. The method of claim 2, further comprising the destination node maintaining data that defines the musical key characteristic,
wherein applying the musical key characteristic when converting the individual characters to corresponding tonal instances comprises referring to the data to determine the musical key characteristic, and converting the individual characters to corresponding tonal instances in accordance with the determined musical key characteristic.

4. The method of claim 1, further comprising:
the destination node maintaining data that specifies one or more characteristics each selected from the group consisting of (i) musical key characteristic, (ii) tempo characteristic, (iii) timbre characteristic, (iv) tonal characteristic, (v) instrumentation characteristic, (vi) orchestration characteristic, (vii) rhythm characteristic, and (viii) harmonics characteristic;
the destination node referring to the data to determine one or more characteristics to apply when playing out at least the established tonal instances; and
the destination node applying the determined one or more characteristics when playing out at least the established tonal instances.

5. The method of claim 1, wherein the unique set of characters defines a name of the calling party.

6. The method of claim 1, wherein the unique set of characters defines an address of the source node.

7. The method of claim 6, wherein the address of the source node is a telephone number of the source node.

8. The method of claim 6, wherein the address of the source node includes information for deriving a location of the source node.

9. In a network having a source node, a network node and a destination node, wherein the destination node is equipped with a ringtone-generation engine to generate a ringtone, wherein the ringtone comprises at least one audible tone, a method for providing an audible calling party identification comprising:

maintaining in the destination node a mapping that correlates characters with musical tones;

the destination node receiving from the network node information for producing a ringtone, wherein the information is originated toward the destination node in response to the source node initiating a call to the destination node, wherein the information comprises textual calling-party identification information having a set of characters;

the destination node generating the ringtone using its ringtone-generation engine and the information, wherein the step of the destination node generating the ringtone comprises the ringtone-generation engine generating the ringtone by referring to the mapping to convert each of a plurality of the set of characters of the textual calling-party identification information to a respective musical tone; and the destination node providing the ringtone as the audible calling party identification by playing out at least the established respective musical tones.

10. The method of claim 9, further comprising the destination node applying a musical key characteristic when converting the characters to musical tones.

11. The method of claim 9, further comprising:

the destination node maintaining data that specifies one or more characteristics each selected from the group consisting of (i) musical key characteristic, (ii) tempo characteristic, (iii) timbre characteristic, (iv) tonal characteristic, (v) instrumentation characteristic, (vi) orchestration characteristic, (vii) rhythm characteristic, and (viii) harmonics characteristic;

the destination node referring to the data to determine one or more characteristics to apply when playing out at least the established respective musical tones; and the destination node applying the determined one or more characteristics when playing out at least the established respective musical tones.

12. The method of claim 1, wherein the destination node subscribes to enhanced services, and wherein the step of the destination node providing the ringtone as the audible calling party identification comprises providing the ringtone during an ongoing communication.

13. The method of claim 12, wherein the enhanced services includes call-waiting services.

14. In a network having a source node, a network node and a destination node, wherein the source node is equipped with a ringtone-generation engine to generate a ringtone, wherein the ringtone comprises at least one audible tone, a method for providing an audible ringback service comprising:

when the source node is initiating a call to the destination node, the source node generating the ringback ringtone using its ringtone-generation engine and a sequence of characters comprising a unique set of characters defining textual called party identification information, wherein the source node includes a mapping for converting the unique set of characters into a ringtone, and wherein the step of the source node generating the ringback ringtone comprises the ringtone-generation engine generating the ringback ringtone by applying the mapping to the unique set of characters, wherein applying the mapping to the unique set of characters comprises referring to the mapping to respectively convert each of a plurality of individual characters of the sequence to a corresponding tonal instance comprising at least one of (i) a single musical note, (ii) multiple musical notes, (iii) a musical chord, (iv) scales and (v) melodies, so as to thereby establish corresponding tonal instances; and the source node providing the ringback ringtone as the audible ringback service by playing out at least the established tonal instances.

15. The method of claim 14, further comprising the source node applying a musical key characteristic when converting the individual characters to corresponding tonal instances.

16. The method of claim 15, further comprising the source node maintaining data that defines the musical key characteristic, wherein applying the musical key characteristic when converting the individual characters to corresponding tonal instances comprises referring to the data to determine the musical key characteristic, and converting the individual characters to corresponding tonal instances in accordance with the determined musical key characteristic.

17. The method of claim 14, further comprising:

the source node maintaining data that specifies one or more characteristics each selected from the group consisting of (i) musical key characteristic, (ii) tempo characteristic, (iii) timbre characteristic, (iv) tonal characteristic, (v) instrumentation characteristic, (vi) orchestration characteristic, (vii) rhythm characteristic, and (viii) harmonics characteristic;

the source node referring to the data to determine one or more characteristics to apply when playing out at least the established tonal instances; and the source node applying the determined one or more characteristics when playing out at least the established tonal instances.

18. The method of claim 14, wherein the step of the source node generating the ringback ringtone comprises the ringtone-generation engine generating the ringback ringtone by converting all of the characters of the sequence to tones so as to generate a unique ringback ringtone.

19. The method of claim 14, wherein the unique set of characters defines an address of the destination node.

20. The method of claim 19, wherein the address of the destination node defines a telephone number of the destination node.

* * * * *

UNITED STATES PATENT AND TRADEMARK OFFICE
CERTIFICATE OF CORRECTION

PATENT NO. : 7,602,901 B1  Page 1 of 1
APPLICATION NO. : 10/895802
DATED : October 13, 2009
INVENTOR(S) : Kates et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1277 days.

Signed and Sealed this

Fifth Day of October, 2010

David J. Kappos
*Director of the United States Patent and Trademark Office*